Job Johnson.
Oyster-Tongs.
N° 75550. Patented Mar. 17, 1868.
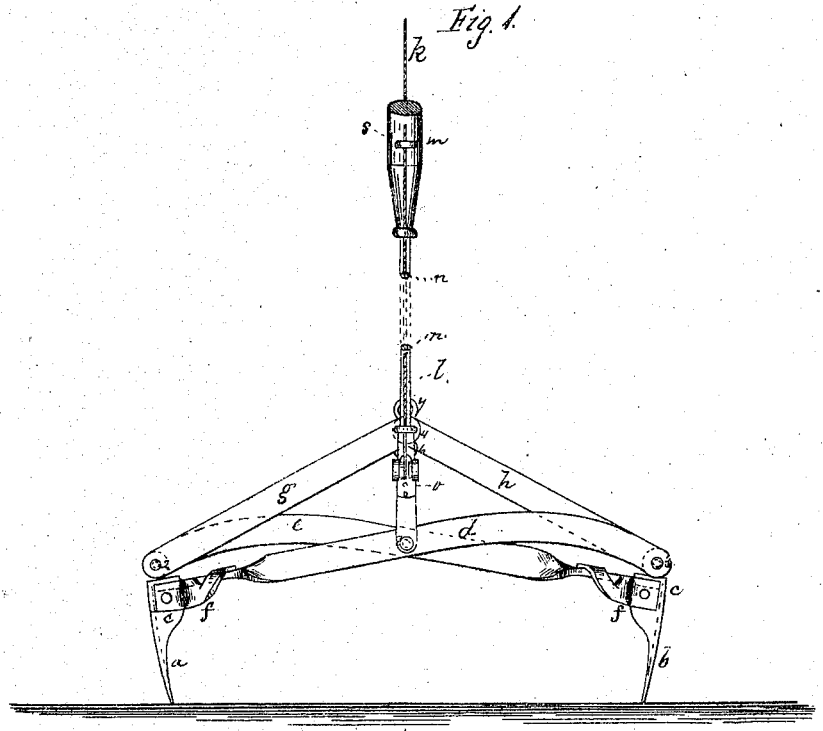
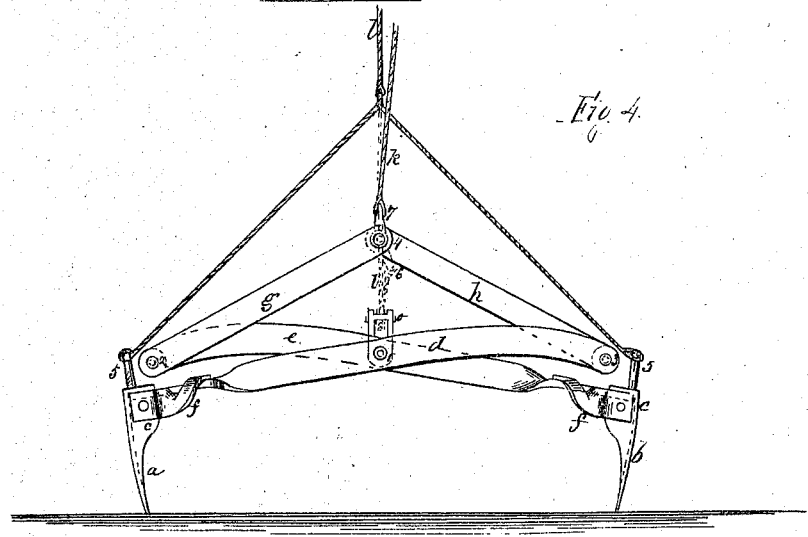

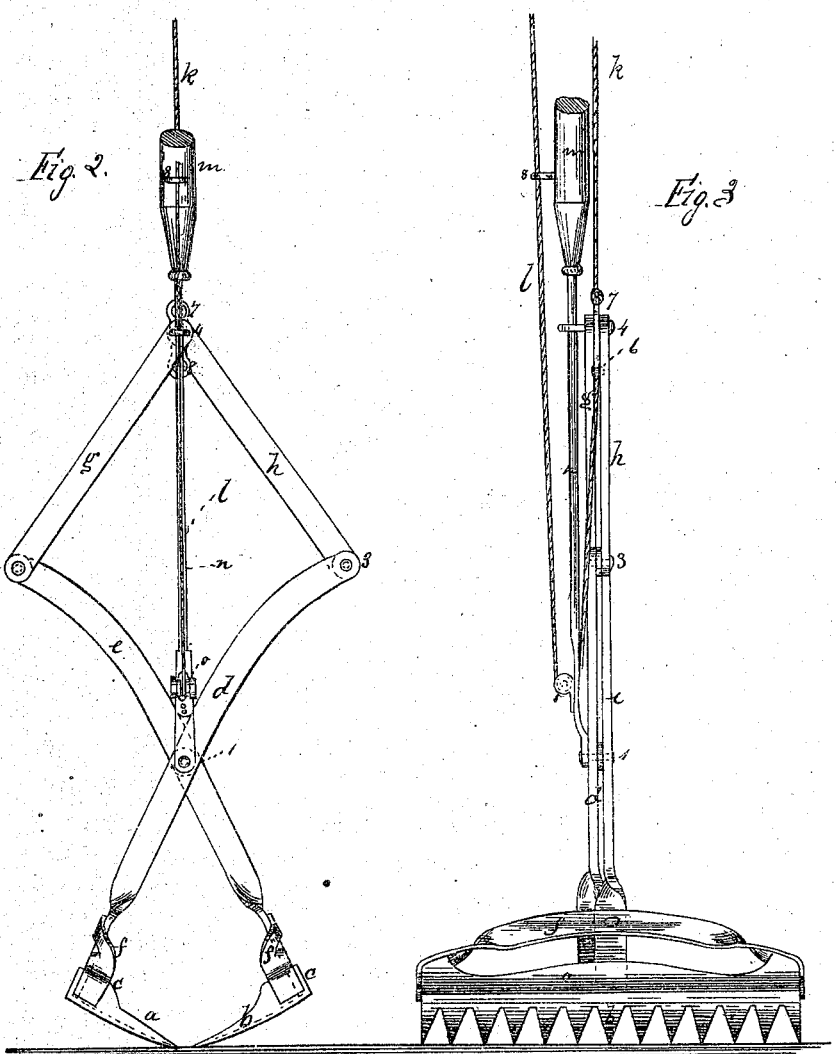

United States Patent Office.

JOB JOHNSON, OF BROOKLYN, NEW YORK.

*Letters Patent No. 75,550, dated March 17, 1868.*

---

IMPROVEMENT IN OYSTER-TONGS.

---

The Schedule referred to in these Letters Patent and making part of the same.

---

TO ALL WHOM IT MAY CONCERN:

Be it known that I, JOB JOHNSON, of Brooklyn, in the county of Kings, and State of New York, have invented, made, and applied to use a certain new and useful Improvement in Oyster-Tongs; and I do hereby declare the following to be a full, clear, and exact description of the said invention, reference being had to the annexed drawing, making part of this specification, wherein—

Figure 1 is a side view of said tongs, as open ready for use.

Figure 2 is a similar view in a closed position.

Figure 3 is an elevation at right angles to fig. 2; and

Figure 4 is a side view with the tongs open, showing a slight variation in the mode of operating said tongs.

Similar marks of reference denote the same parts.

My invention is a modification of and improvement upon those oyster-tongs that were patented by me, October 2, 1866.

This invention relates to a pair of toggle-bars combined with the oyster-tongs in such a manner that said tongs, by the action of a rope and pole, or by the action of two ropes, may be opened or closed at pleasure, and be employed at any depth to gather oysters or any substance under water.

In the drawing, $a$ and $b$ represent rake-teeth or prongs of any desired size or shape. I have represented the same as teeth cut from a sheet of metal, which also forms a head or scoop, $c$, for holding the oysters or other materials gathered by the tongs. $d$ and $e$ are the handles of the tongs, united to the heads $c$ of the teeth $a$ and $b$, respectively, and jointed at 1. Braces or fender-bars are also employed between the handles and the heads of the scoop or rake, as at $f$. The ends of the bars $d$ and $e$ are jointed to the toggle-bars $g$ and $h$, respectively, at 2 and 3, and at the upper part of the apparatus the bars $g$ and $h$ are united by the joint 4. In fig. 4 this apparatus is shown in a form adapted to deep water. The rope $k$ is attached to an eye or device, 7, at the joint 4, and the rope $l$ is attached by the branches to the eyes 5.

When the apparatus is opened into the position shown in fig. 4, it is to be lowered, the two ropes, $k$ and $l$, passing through the hands of the operator, or otherwise, so that the apparatus is in a condition for use. By drawing upon the rope $k$, the toggle-bars $g$ and $h$ will be raised, closing the rake or drawing the teeth of the tongs towards each other, so as to grasp any oysters or other substances between the tongs, and by continuing to pull on the same the tongs will be kept together and drawn up. If it becomes necessary to open the tongs to disengage them from any heavy or useless substance, it can be done by drawing upon the rope $l$.

The same general features exist in the tongs represented in the other figures of the drawing, the rope $k$ being employed to close and draw up the tongs and the rope $l$ to open them. It, however, is often necessary that the attendant be able to press the tongs down into the mud or upon the article to be grasped; for this purpose I employ a pole, $m$, at the lower end of which I provide a rod, $n$, attached at its bottom end to the tongs by the bolt or rivet of the joint 1, so that the power to press down the tongs can be applied at this point, and said tongs be still in a condition to be closed by drawing upon the rope $k$. I find it advantageous to employ an eye at the joint 4, to travel over the rod $n$, to guide the parts as the tongs are opened or closed.

I have shown, in figs. 1, 2, and 3, the rope $l$ as passing under a sheave, $o$, on or in the handle or rod $n$, and going up to a loop or eye, 6, at the under side of the joint 4, so that the tongs will be opened by drawing down this joint 4 of the toggle-bars $g$ and $h$. An eye might be substituted for the sheave $o$. The rod or pole $m\ n$ may be attached in any convenient manner to whichever joint of the tongs desired. I, however, prefer the same applied in the way shown. The rope $l$ may pass through an eye, 8, on the pole $m$, and if a knot is applied above that eye, or any other stop applied to said rope, it will prevent the tongs closing beyond a given point.

The tongs shown in fig. 4 may be provided with a sheave, $o$, attached to the joint 1, and formed with cheek-pieces, to prevent the rope slipping off, and through this the rope $l$ may be passed, as shown in fig. 4, by red lines, and led to the eye 6, at the joint 4, so as to open or close the tongs as before described. The eyes 6 and 7 should be made at the ends of a metal plate, introduced at the joint 4, between the bars $g$ and $h$.

What I claim, and desire to secure by Letters Patent, is—

1. The pair of toggle-bars $g\ h$, jointed to the ends of the tongs $d\ e$, substantially as specified, so that the tongs will be closed by drawing up the joint between the bars $g\ h$, or opened by drawing the joint between the bars $d\ e$, towards the said joint, between the bars $g\ h$.

2. In combination with the toggle-bars $g\ h$ and tongs $e\ d$, as aforesaid, I claim the pole or bar $m\ n$, and the ropes or chains $k\ l$, substantially as and for the purposes specified.

In witness whereof, I have hereunto set my signature, this twentieth day of April, 1867.

JOB JOHNSON.

Witnesses:
CHAS. H. SMITH,
GEO. D. WALKER.